United States Patent [19]

Blackwell

[11] Patent Number: 4,491,248

[45] Date of Patent: Jan. 1, 1985

[54] FREE PISTON VOLUMETRIC MEASURING DEVICE AND METHOD FOR MEASURING WHEREIN THE PISTON HAS A SPECIFIC GRAVITY APPROXIMATELY MATCHED TO THE LIQUID BEING DISPENSED

[76] Inventor: John S. Blackwell, 1 Hickory Dr., Stamford, Conn. 06902

[21] Appl. No.: 531,605

[22] Filed: Sep. 12, 1983

[51] Int. Cl.³ .............................................. G01F 11/04
[52] U.S. Cl. .................................... 222/249; 222/386; 73/239
[58] Field of Search ................... 222/1, 309, 249, 250, 222/386, 335, 71, 72; 92/172, 176, 255, 258; 73/239

[56] References Cited

U.S. PATENT DOCUMENTS

| | | | |
|---|---|---|---|
| 1,144,583 | 6/1915 | Brown | 222/249 |
| 1,904,829 | 4/1933 | Hurlbrink | 222/249 |
| 2,886,214 | 5/1959 | Sturman | 222/335 |
| 3,344,667 | 10/1967 | Maltby | 73/239 |
| 3,358,888 | 12/1967 | Dawson | 222/250 |
| 4,240,291 | 12/1980 | Andersson et al. | 73/861.05 |

Primary Examiner—Joseph J. Rolla
Assistant Examiner—Michael S. Huppert
Attorney, Agent, or Firm—Gene S. Winter

[57] ABSTRACT

A liquid measuring device for dispensing measured volumes of liquid from a source of liquid under pressure is disclosed and includes a cylinder, a free piston for reciprocal traveling in the cylinder. In accordance with the present invention, the piston has a specific gravity that is adjusted to approximately match the specific gravity of the liquid thus improving the precision and accuracy of the dispensing device.

10 Claims, 9 Drawing Figures

FREE PISTON VOLUMETRIC MEASURING DEVICE AND METHOD FOR MEASURING WHEREIN THE PISTON HAS A SPECIFIC GRAVITY APPROXIMATELY MATCHED TO THE LIQUID BEING DISPENSED

BACKGROUND OF THE INVENTION (1) Field of the Invention

The present invention relates to a liquid measuring device for dispensing measured volumes of liquid from a source of liquid under pressure. More specifically, the present invention relates to a liquid measuring device of the type having a cylinder and piston, with chambers on either side of the piston, each defining the volume to be dispensed.

(2) Description of the Prior Art

In many applications, it is desirable to measure an accurate and precise volume of liquid to be dispensed. In the packaging industry in particular, it is desirable to provide a measuring device that measures liquid accurately and precisely. In the packaging field, standards often exist for filling containers with liquid to insure that they contain at least the amount specified. For example, if an apparatus fills a container to a set volume, which varies positively or negatively from the volume set on the dispensing apparatus, many governmental bodies require that the apparatus be set slightly higher so that a statistically high number of containers have a volume that is at or exceeds the desired volume. In the packaging industry, it is common for a dispensing device to be rigorously tested to determine its precision, and with a statistically relevant sample, determine the standard deviation for the volumes being dispensed. Once the standard deviation is determined, it is typical for a governmental body to require that the apparatus be set at the volume desired plus a multiple of the standard deviation of a statistically relevant sample. It is not uncommon for dispensing devices to be set at volume levels that are 0.25% or greater of the volume being dispensed. While this volume may seem small, when hundreds of thousands to millions of containers are filled, the quantity of liquid dispensed in excess of the labeled amount becomes a costly factor.

U.S. Pat. No. 384,766 to Kendall and U.S. Pat. No. 1,144,583 both disclose a liquid measuring device having a double acting piston that is operated by a four-way valve. Liquid under pressure is supplied through a four-way valve to both chambers of the cylinder. Liquid is admitted one chamber and moves the piston to dispense a volume of liquid from the other chamber. U.S. Pat. No. 4,036,409 and U.S. Pat. No. 1,995,342 also disclose liquid measuring devices of a similar type.

In prior art measuring devices, the piston is typically made of solid material, such as, for example, stainless steel and has a specific gravity that is substantially greater than the fluid being dispensed. For example, the Langlais patent discloses a fluid metering device that has a piston which moves vertically within a cylinder. On the upstroke of the piston, the fluid supplied to the lower chamber tends to leak through a clearance between the piston and the cylinder thus adding a small incremental volume to the volume being dispensed from the upper chamber. On the downward stroke of the piston, movement of the piston is aided by the weight of the piston itself and the volume dispensed from the lower chamber is decreased by a small incremental volume because of leakage from the lower chamber into the upper chamber.

In prior art free piston devices, the piston may be sealed to the cylinder by flexible seals, piston rings, or other sealing means. If this is done by a highly accurate measure can be achieved. The problem encountered with seals however include the following:

(1) The seals tend to wear causing leakage, maintenance costs and contamination of product.

(2) The seals require much higher fluid pressure to operate, particularly when handling liquids with low lubricating qualities.

(3) The seals may result in trapping of air within measuring chambers from product which will adversely affect accuracy.

It is an object of the present invention to provide a liquid dispensing device which provides extremely accurate and precise dispensing of liquid. It is another object of the present invention to provide a measuring device which does not require seals between the piston and the wall of the cylinder along which the piston moves, thereby avoiding the necessity of changing the seals regularly. It is a further object of the invention to provide a "free" piston type device, i.e. that is, one which operates on the pressure of the liquid being the dispensed.

SUMMARY OF THE INVENTION

In accordance with the present invention, a liquid measuring device is provided for dispensing a measured volume of liquid from a source of liquid under pressure. The device comprises a cylinder and a free piston in said cylinder for reciprocal travel. The cylinder has a chamber on each side of the piston. The device also includes means for supplying the liquid under pressure alternatively to each chamber to fill one chamber and move the piston to dispense a measured volume of liquid from the other chamber. In accordance with the present invention, the accuracy and precision of the volume dispensed is improved by adjusting the specific gravity of the piston to approximately match the specific gravity of the liquid being dispensed. By approximately matching the specific gravity of the piston to the liquid being dispensed, the piston is substantially suspended in equilibrium in the liquid. By equilibrium, it is meant that the piston will suspend, immersed in liquid, where the weight of the piston is equal to the weight of the liquid which it displaces.

In accordance with one aspect of the invention, the need for a seal is eliminated by approximately matching the specific gravity of the piston to the liquid being measured, thus eliminating the wear problem, allowing filling to be accomplished at conventional filling machine pressures and when the cylinder is mounted vertically, allowing accumulating air to bypass the piston and be automatically ejected from the measuring device. This arrangement will allow the unsealed piston to approach or meet the accuracy of a sealed piston. Considering normal deterioration factors with seals, the accuracy of the device is extended over numerous operating cycles.

In a piston and cylinder arrangement having a clearance between the piston and the walls of the cylinder, the clearance is filled with liquid and the piston moves without substantial friction between it and the cylinder walls. Because the piston is in substantial suspended equilibrium in the liquid, little or no leakage occurs through the clearance because the piston tends to move with the liquid as it is being dispensed.

In accordance with one aspect of the invention, the piston includes a hollow volume which is accessible for removal and insertion of weight. Alternatively, a series of pistons, each having a different specific gravity may be supplied with the device, and the piston with a specific gravity which approximately matches the specific gravity of the liquid being dispensed may be used.

With a liquid measuring device in accordance with the present invention, liquid may be dispensed repeatedly in an accurate and precise volume. Because the piston is substantially in suspended equilibrium with the liquid being dispensed, little or no leakage occurs through the piston and cylinder wall of the device, and, therefore, the volume of liquid dispensed on the downstroke is equal, within desired tolerances, to the volume of liquid dispensed on the upstroke. With a device in accordance with the present invention, the volume dispensed over a statistically relavent series of dispensings shows that the standard deviation for the volumes dispensed may be reduced thereby reducing the additional liquid that is dispensed when the device is set to account for deviations in accuracy. A device in accordance with the present invention reduces the excess liquid that is typically included in a container, and thereby reduces manufacturing costs. When the device is used to fill hundreds of thousands to millions of containers, the savings can be extensive.

DETAILED DESCRIPTION OF THE INVENTION

Figure 1:
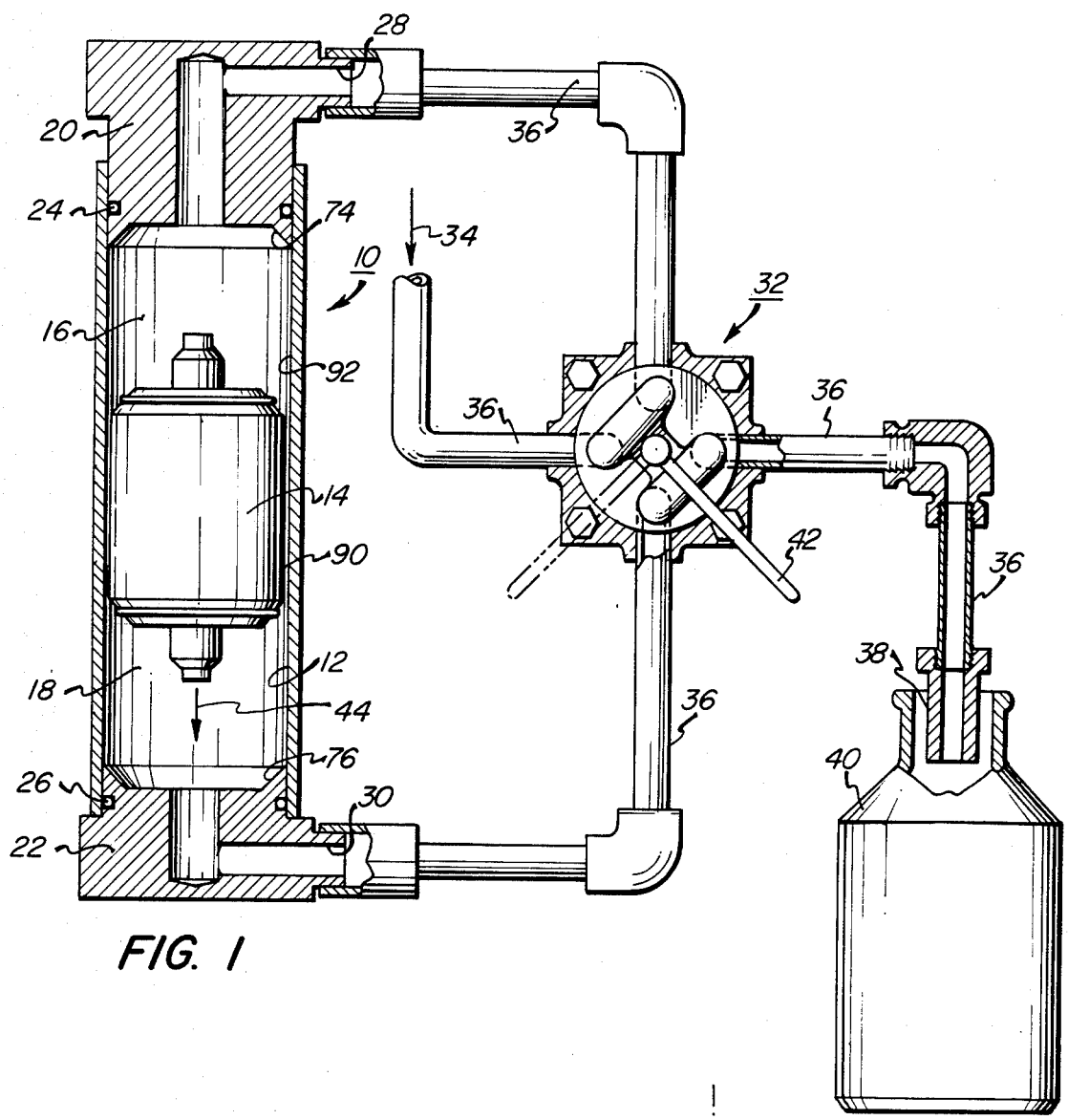
FIG. 1 is a sectional view of a cylinder and piston arrangement in accordance with the present invention showing a schematic attachment to a four-way valve for controlling dispensing.

Referring to FIG. 1, a liquid measuring device in accordance with the present invention is shown. The device includes a piston and cylinder arrangement 10 including a cylindrical cylinder 12 and a cylindrical piston 14. The piston reciprocates between an upper most position shown in FIG. 4 and a lower most position shown in FIGS. 6 and 7. The cylinder 12 defines an upper chamber 16 and a lower chamber 18. The cylinder is sealed at either and by end plugs 20 and 22 which fit within the cylinder and are sealed respectively by rings 24 and 26 which are conventional elastomeric O-rings. The upper plug 20 is movable to various positions upwardly and downwardly from the position shown in FIG. 1 to there by vary the amount of volume dispensed. Chambers 16 and 18 includes liquid ports 28 and 30 for permitting flow of liquid into and out of the respective chamber. The ports 28 and 30 are connected through a four-way valve 32 to a pressurized source of fluid 34 to a series of pipes 36. The four-way valve 32 is also connected to a dispensing nozzle 38 which dispenses liquid into a container 40.

The four-way valve is conventional and is operated by a lever on 42 to be moved between two positions. In the position shown in FIG. 1, the source of fluid under pressure 34 is connected to port 28 of chamber 16 whereas port 30 of chamber 18 is connected to dispensing nozzle 38. Thus, fluid under pressure is supplied to chamber 16 forcing the piston downwardly in the direction by arrow 44 thereby dispensing into the container 40 a volume of fluid equal to the volume of chamber 18. Although the valve 32 is operated manually by lever 42, it should be understood that in commercial applications, the timing of the four-way valve may be operated by a suitable mechanism such as an air piston, mechanical cams, and an electric solenoid. Thus the liquid under pressure 34 is alternatively supplied to each chamber to fill one chamber and move the piston to dispense a measured amount of liquid from the other chamber. It should be understood that the piston and cylinder may be controlled by various types of hydraulic controls and not necessarily a four-way valve.

Figure 4:
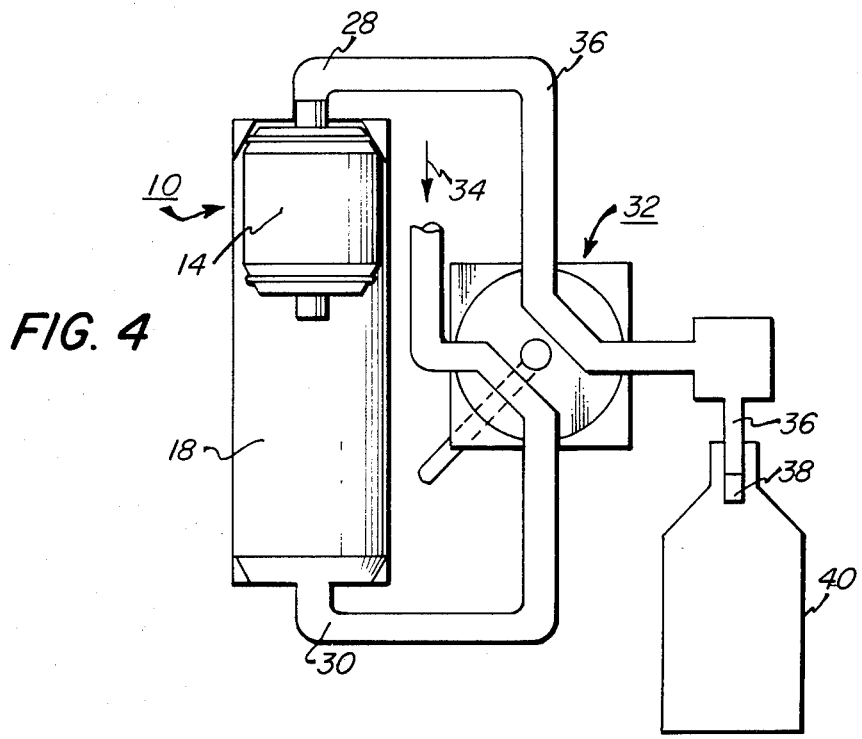
FIGS. 4 through 9 are schematic diagrams of a measuring device in accordance with the present invention at various stages of operation during filling of containers.
Figure 5:
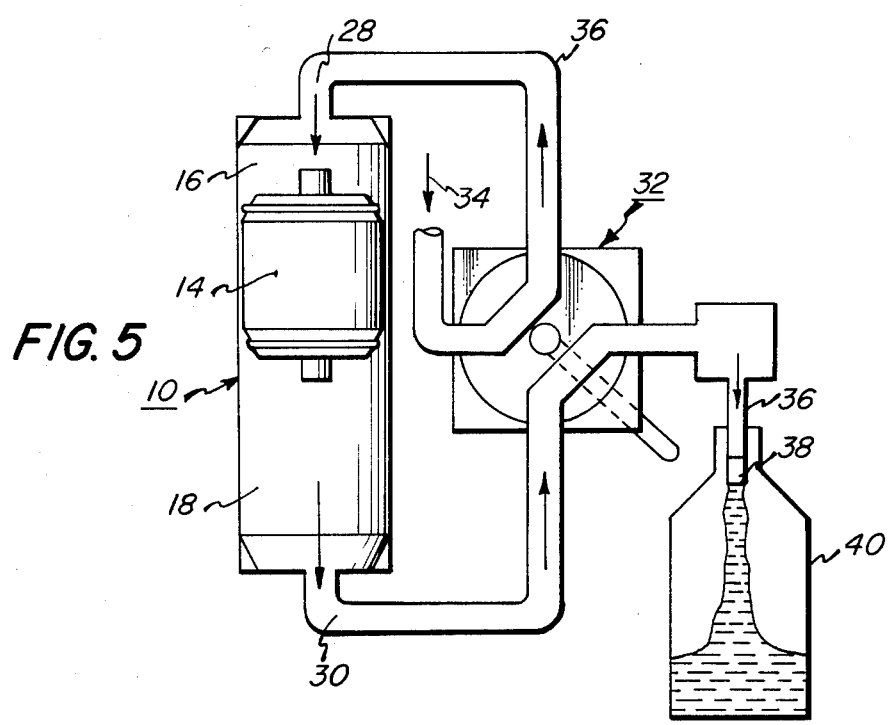
Figure 6:
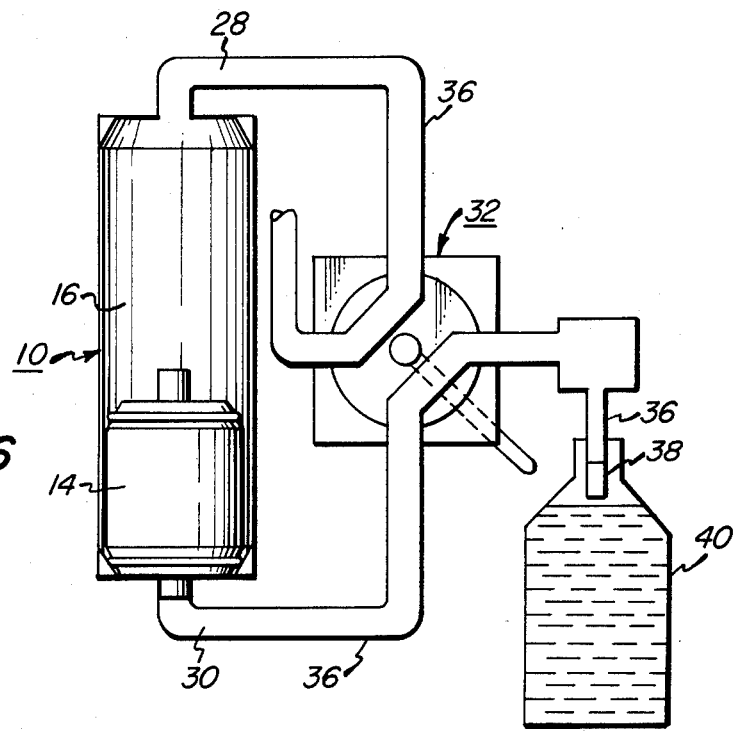
Figure 7:
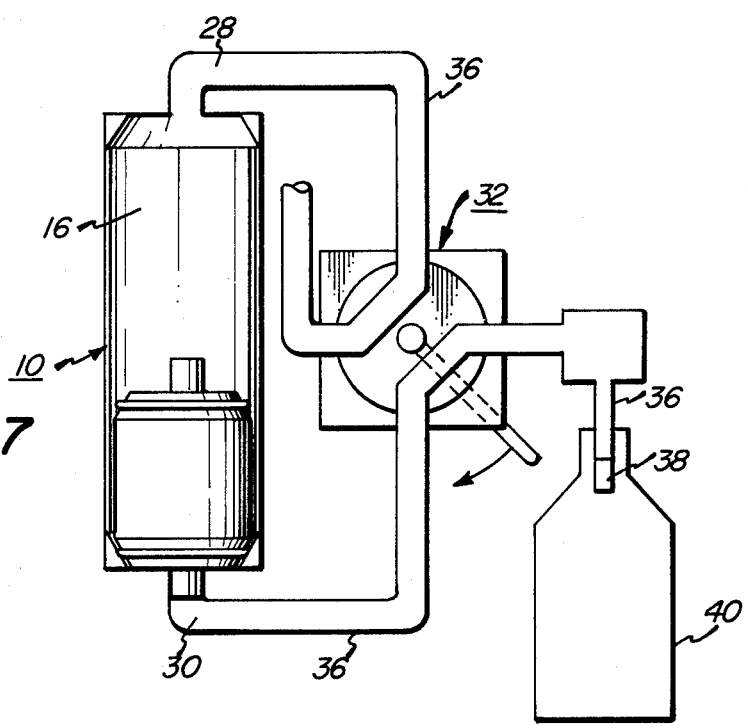
Figure 8:
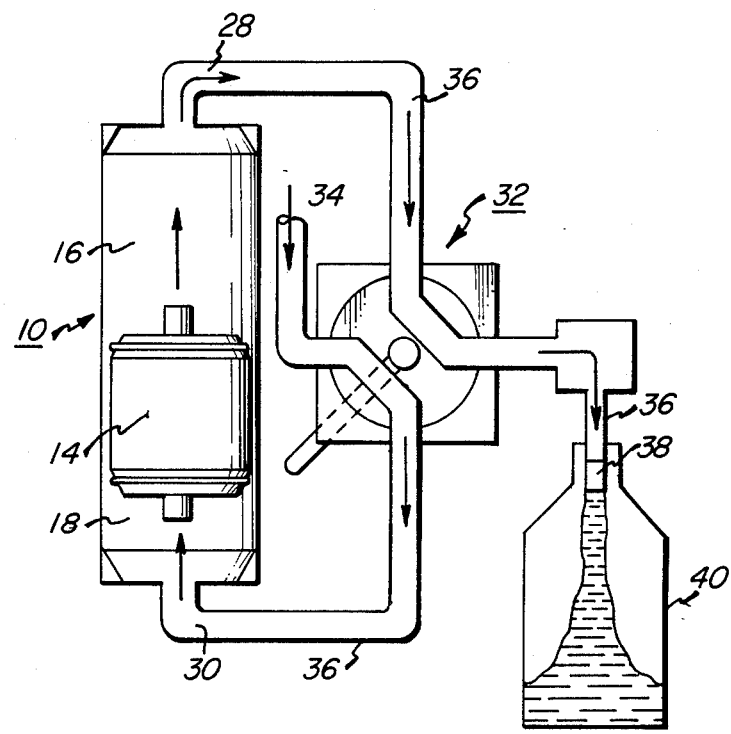
Figure 9:
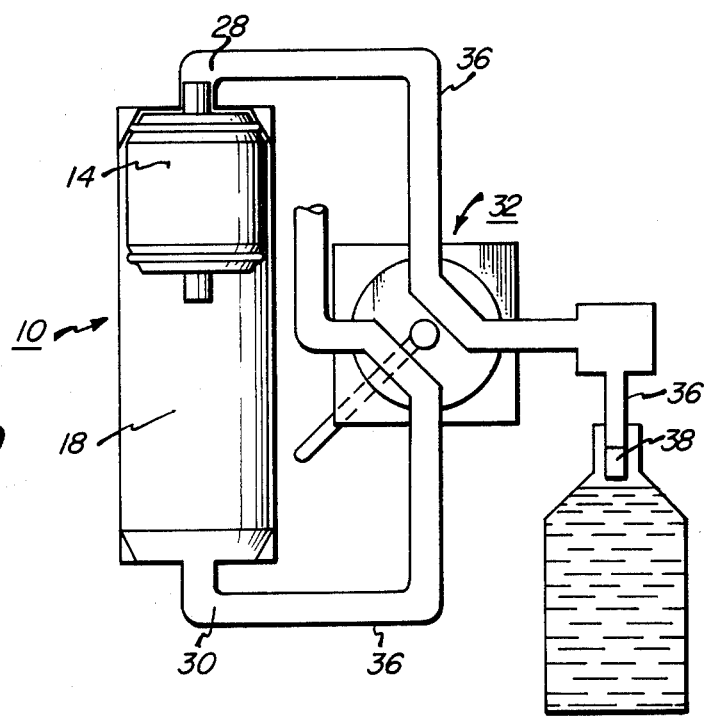

Referring to FIGS. 4 through 9, operation of the device will be described. FIG. 4 shows the piston at its upper most position. The source of fluid under pressure 34 is connected by the four-way valve to chamber 18 thereby maintaining the piston in its upper position. A empty container 38 is placed under dispensing nozzle 36. The four-way valve is switched from the position shown in FIG. 4 to the position shown in FIG. 5 thereby connecting port 28 with the source of fluid under pressure 34. Liquid under pressure moves the piston 14 downwardly in the direction shown by the arrow in FIG. 5 and begins to dispense liquid from lower chamber 18. FIG. 6 shows the piston in its lower most position with the container 38 filled to the desired level. The container is removed and an empty container is positioned in its place as shown in FIG. 7. The four-way valve 32 is switched to a position wherein the source of liquid under pressure 34 is connected to port 30 to fill chamber 18. As shown in FIG. 8 liquid in chamber 16 is then dispensed into the container 38. Referring to FIG. 9, once the piston reaches the top of its stroke, the container 38 is filled to the desired level. The container 38 is then removed and a new container is positioned in its place as shown in FIG. 4. The cycle may then be repeated.

Figure 2:
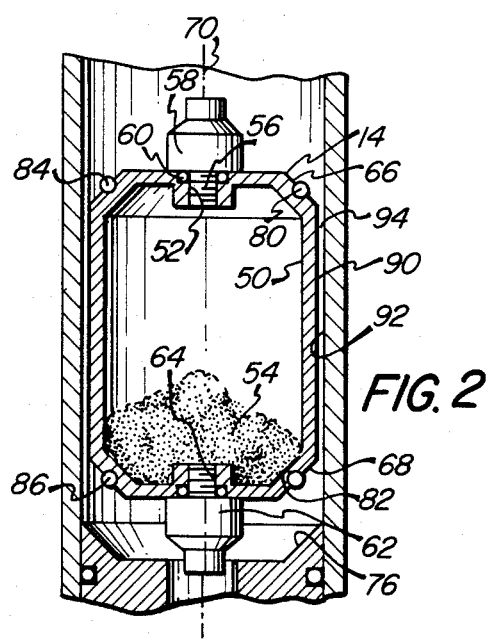
FIG. 2 is a sectional view of one embodiment of a piston in accordance within the present invention.

Referring to FIG. 2, a cross sectional view of a piston having an adjustable specific gravity is shown. The piston 14 includes a hollow volume 50 therein. The piston may be made of various materials including stainless steel. At one end of the piston an opening 52 is provided for insertion and removal of weight such as granular material 54. The opening 52 is threaded to receive screw 56 which is attached to one end of a conventional metering pin 58. An elastomeric O-ring 60 seals the area between the metering pin 58 and the top of piston 14. The metering pin 58 as well as the metering pin 62 located at the opposite end provides for reduced volume flow of liquid at the end of each cycle. The opposite end of piston 14 may include a similar access opening, although it is possible to use a piston having only one opening. The piston 14 on either end includes annular surfaces 66 and 68 which are inclined with respect to the longitudinal axis of the piston 70 and which seat respectively on piston seats 74 and 76 (See FIG. 1 for seat 74). The surface of each annular seat 66 and 68 includes a groove 80 and 82 in which O-ring seals 84 and 86 are positioned. The O-ring seals, which are preferably made of an elastomeric material, deform slightly when pressed against seats 74 and 76 to effectively prevent further flow of liquid.

Referring once again to FIG. 2, the piston has a specific gravity that is adjustable by addition or subtraction of granular weight 54. Although various methods of matching a specific gravity of a piston with a specific gravity of a liquid being dispensed may be used, it has been found that weight may be added and substracted to and from the piston until the piston reaches suspended equilibrium in the liquid. By suspended equilibrium, it is meant that the piston is suspended in the liquid and the weight of the piston is equal to weight of the liquid it displaces. According to Archimede's principal, a body immersed in static liquid is acted upon by a vertical force equal to the weight of the liquid displaced. If the weight of the piston is approximately the same as the weight of the liquid displaced, the piston will remain suspended in the liquid without movement upwardly or downwardly.

When the specific gravity of the piston and specific gravity of a liquid being dispensed is matched, the piston is in substantially suspended equilibrium in the liquid. As shown in FIGS. 1 and 2, the piston includes a cylindrical outer wall 90 which has a diameter that is slightly smaller than the inner diameter of the interior surface 92 of cylinder 12 thereby providing a clearance 94 between the piston and the cylinder. It should be understood that the clearance 94 is slightly exaggerated in the drawings to enable the clearance to be seen. In practice, the clearance should be sufficient to permit substantially free movement of the piston within the cylinder and to avoid substantial friction between the piston wall 90 and the cylinder wall 92 during movement. During operation, the clearance is filled with the liquid being dispensed. Because the piston has a matched specific gravity with the liquid, there is little or no tendency for liquid to move through the clearance during the dispensing cycle. The volume of fluid dispensed during the upstroke and the downstroke of the piston is equal within desired tolerances.

It should be understood that the closer the piston is to the specific gravity of the liquid, the more accurate the measure will be. It should also be understood that the larger the clearance between the piston and cylinder, the greater the error due to mismatched specific gravities. These facts will be proven by data described later.

It should be understood that it is preferred that the ratio of the specific gravity of the piston to the liquid be between the range of about 0.80 to about 1.20, preferably about 0.95 to about 1.05, and most preferably between about 0.98 to about 1.02.

It should be understood that FIG. 2 shows an embodiment of the piston which provides for adjustment of its specific gravity. Various types of piston constructions may be used to enable matching of the specific gravity of the piston with the liquid, and that the piston shown in FIG. 2 is shown by way of example only. A dispensing device may be supplied with a plurality of pistons, each having a different specific gravity. The piston selected should approximately match the specific gravity of the liquid.

Figure 3:
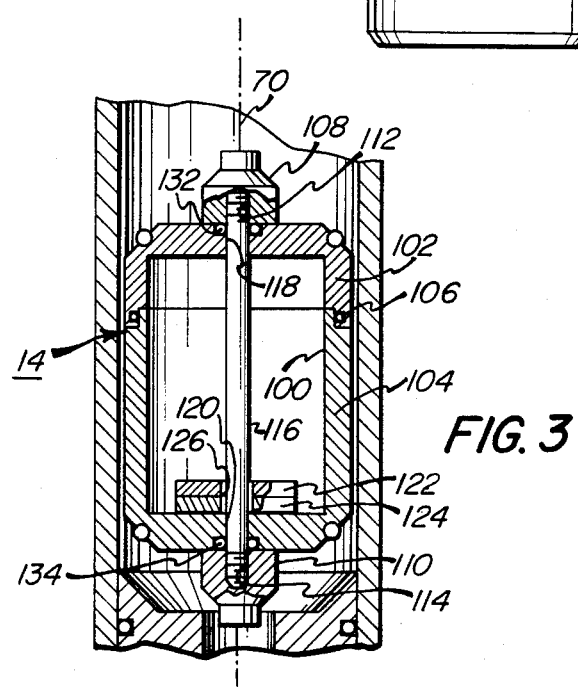
FIG. 3 is a sectional view of an alternative embodiment of a piston in accordance with the present invention.

Referring to FIG. 3, another embodiment of a piston having an adjustable specific gravity is shown. The piston shown once again has a hollow volume 100 which is accessible by separating the halves 102 and 104 of the piston. An O-ring seal 106 is positioned between the halves and provides a liquid seal. Metering pins 108 and 110 have threaded openings 112 and 114 which receive central spindle 116 that is located on the longitudinal axis 70 of the piston. The spindle extends through openings 118 and 120 of the ends of piston 14. In order to separate the halves of the piston, one or both of the metering pins 108 and 110 are unscrewed from the threaded ends of rod 116. Once the halves are separated, weights 124 having central apertures 126 are mounted on the rod 116. Rod 116 functions to maintain the weights in the center of the piston and gravity maintains the weights at the lower most point in the hollow volume 100. It should be understood that the type of weights 122 and 124 are shown by way of example, and that other types of weights can be used in place of or in addition to barbell type weights. For example, for relatively fine adjustments, granular weight may be added to precisely match the specific gravity of the piston to the cylinder. Once the appropriate amount of weight is positioned in the piston, the metering pins 108 and 110 are screwed to the rod 116. O-ring seals 132 and 134 provide for liquid tight sealing between the pins and openings 118 and 120.

The following examples set forth in detail the relationship between accuracy and matching of the specific gravity of piston with the liquid when using an unsealed piston. The data further illustrates the additional effect of different clearances between the piston and cylinder.

The test apparatus comprised a piston and cylinder arrangement of the type shown in FIG. 1. The inner diameter of the cylinder was sized to $$3.000 \text{ inches } {}^{+.0008}_{-.0000}.$$

Two different pistons were tested, one with an outer diameter of $$2.992 \text{ inches } {}^{+.000}_{-.002},$$

providing a clearance of approximately 0.009 inches (tight piston). The second piston with a diameter of $$2.950 \text{ inches } {}^{+.001}_{-.001}.$$

had a clearance of approximately 0.050 inches (loose piston). The liquid dispensed was water with an approximate specific gravity of 1.00 (0.999@60° F.).

EXAMPLE 1

This test was run with a loose piston (0.050 total clearance). It should be noted that a loose piston is less accurate than a tighter piston but the beneficial results obtained with a matched specific gravity piston is greatly amplified. Three sets of tests were run for this example. The first being a light weight piston weighing 345 grams, the second being a matched specific gravity piston attained by adding weight to the piston until neutral buoyancy resulted when placed in water and the piston weighted 445 gms, and the third, a heavy weight piston weighing 544 gms. The specific gravity of the piston was therefore:

$$\text{Lightweight } \frac{345}{445} = .77 \text{ S.G.}$$

$$\text{Neutral } \frac{445}{445} = 1.00 \text{ S.G.}$$

-continued $$\text{Heavyweight } \frac{544}{445} = 1.22 \text{ S.G.}$$

With the piston installed in the cylinder and water supplied to the test fixture under a pressure of 8 pounds per square inch, three series of tests were run each consisting of alternate runs (piston up and piston down), for a total of 10 trials each. The weight of the container was checked and recorded before each trial and the final weight of product for each trial recorded. Using normal statistical analysis methods, the accuracy (sigma) for each of the three tests has been calculated and indicated on the following data table:

placed volumes on downstroke and high displaced volumes on upstroke.

Inasmuch as both up and downstrokes must be used in a dispensing machine, the total accuracy (sigma) is calculated using all 20 trials.

EXAMPLE 2

While a loose piston illustrates the advantage of balancing the specific gravity of the piston with the specific gravity of the liquid measures, considerably better accuracy can be obtained with the tight piston.

This example was divided into two tests. In the first, a matched piston having a weight of 565.8 gms. and a specific gravity of 1.00 was used. In the second, a piston having a weight of 827.1 gms. and a specific gravity of

DATA TABLE NO. 1

| | Example 1A-Light Piston 345 grams; Specific Gravity: .77 | | | | Example 1B-Balanced Piston 445 grams; Specific Gravity: 1.00 | | | | Example 1C-Heavy Piston 544 grams; Specific Gravity: 1.22 | | | |
|---|---|---|---|---|---|---|---|---|---|---|---|---|
| | Down | | Up | | Down | | Up | | Down | | Up | |
| | Empty Weight | Full Weight | Empty Weight | Full Weight | Empty Weight | Full Weight | Empty Weight | Full Weight | Empty Weight | Full Weight | Empty Weight | Full Weight |
| 1 | 0 | 1153 | 0 | 874 | 0 | 1006 | 1 | 1001 | 0 | 858 | 0 | 1193 |
| 2 | 0 | 1154 | 1 | 872 | 0 | 1009 | 0 | 1000 | 0 | 857 | 0 | 1197 |
| 3 | 1 | 1161 | 2 | 872 | 0 | 1003 | 0 | 1007 | 1 | 859 | −1 | 1201 |
| 4 | 1 | 1158 | 2 | 869 | 1 | 1005 | 0 | 1008 | −1 | 858 | −1 | 1205 |
| 5 | 2 | 1157 | 2 | 873 | 0 | 1005 | 1 | 1002 | −1 | 855 | −1 | 1203 |
| 6 | 2 | 1170 | 2 | 873 | 0 | 1006 | 1 | 1004 | 0 | 857 | −1 | 1200 |
| 7 | 2 | 1177 | 2 | 867 | 0 | 1006 | 0 | 1007 | 0 | 857 | −1 | 1201 |
| 8 | 2 | 1163 | 2 | 872 | 0 | 1005 | 0 | 1013 | 0 | 855 | −1 | 1206 |
| 9 | 2 | 1163 | 2 | 872 | 1 | 1008 | 1 | 1006 | 0 | 856 | −1 | 1206 |
| 10 | 2 | 1173 | 2 | 868 | 1 | 1009 | 0 | 1011 | 1 | 856 | 0 | 1205 |
| $\overline{X}$ | | 1162.9 | | 871.2 | | 1006.2 | | 1005.9 | | 856.8 | | 1201.7 |
| $\sigma$ | | 8.10 | | 2.35 | | 1.93 | | 4.23 | | 1.32 | | 4.24 |
| $(\overline{X} - \underline{X})$ | | 291.7 gms. | | | | .3 gms. | | | | −344.9 | | |
| Total $\overline{X}$ | | 1017.05 | | | | 1006.05 | | | | 974.25 | | |
| $\sigma$ | | 149.75 | | | | 3.11 | | | | 267.75 | | |

The data illustrates the advantages of the balanced piston. The lightweight piston tends to float. Thus, on the downstroke considerable product bypasses the piston as it moves upward through the clearance and past the piston. On the upstroke, the piston floats upward faster than the liquid moving upward. With the balanced piston, little motion results between the piston and liquid, consequently the average amount dispensed on the upstroke and downstroke is about the same. Finally, with the heavy piston, the reverse to the light piston occurs. The piston sinks through the liquid on both upstroke and downstroke, resulting in low displaced volumes on downstroke and high displaced volumes on upstroke.

1.46 was used. The results of these tests are tabulated on Data Table No. 2. Even with the "tight" piston, the advantage of matching specific gravity is apparent.

DATA TABLE NO. 2

| | Example 2A-Balanced Piston | | | | Example 2B-Heavy Piston | | | |
|---|---|---|---|---|---|---|---|---|
| | Down | | Up | | Down | | Up | |
| | Empty Weight | Full Weight | Empty Weight | Full Weight | Empty Weight | Full Weight | Empty Weight | Full Weight |
| 1 | .1 | 918.7 | .5 | 919.2 | .4 | 912.4 | .5 | 919.1 |
| 2 | .4 | 918.8 | .7 | 919.7 | .3 | 914.8 | .4 | 919.9 |
| 3 | .6 | 918.3 | .7 | 919.3 | .6 | 915.0 | .4 | 919.9 |
| 4 | .5 | 918.8 | .5 | 918.7 | .5 | 914.9 | .5 | 920.2 |
| 5 | .7 | 919.1 | .3 | 918.7 | .5 | 915.0 | .6 | 920.2 |
| 6 | .6 | 919.1 | .6 | 918.8 | .5 | 914.9 | .6 | 920.1 |
| 7 | .4 | 918.8 | .6 | 918.8 | .1 | 914.3 | .6 | 920.1 |
| 8 | .5 | 918.9 | .4 | 918.7 | .5 | 915.1 | .4 | 919.8 |
| 9 | .5 | 918.7 | .5 | 918.8 | .7 | 916.0 | .3 | 919.3 |
| 10 | .5 | 918.8 | .4 | 919.0 | .4 | 915.7 | .5 | 919.8 |
| $\overline{X}$ | | 918.80 | | 918.97 | | 914.81 | | 919.84 |
| $\sigma$ | | .22 | | .33 | | .97 | | .37 |
| $\overline{X} - \underline{X}$ | | −.17 gms. | | | | −5.03 gms. | | |
| Total $\overline{X}$ | | 918.89 | | | | 917.33 | | |
| Total $\sigma$ | | .29 | | | | 2.68 | | |

With respect to the examples, it can be seen that with a measuring device with a piston having a specific gravity that is not matched with the liquid being dispensed is inaccurate. Over a period of hundreds of thousands of container fillings, the volume of liquid dispensed due to inaccuracies amounts to relatively large volumes. Thus, using a device of the present invention, substantial economies may be obtained.

In summary, it can be seen that a liquid measuring device in accordance with the present invention provides for substantial economies in the dispensing of liquids. The advantages of a device in accordance with the present invention include: highly accurate measurement; low operational pressure of the liquid; no wearing of seals or operating mechanisms; automatically vents trapped air which will normally accumulate with operation in devices with seals; no critical machine fits which are usually required with sliding seals; less costly construction; and no contamination of product due to wear particles of seals.

It should be understood that although specific embodiments of the invention have been described herein in detail, such description is for purposes of illustration only and modifications may be made thereto by those skilled in the art within the scope of the invention.

I claim:

1. A liquid measuring device for dispensing measured volumes of liquid from a source of liquid under pressure, the liquid having a specific gravity, the device comprising:

a cylinder;

a free piston for reciprocal traveling in said cylinder, said cylinder having a chamber on each side of said piston, said piston having a specific gravity;

means for supplying said liquid under pressure from said source alternatively to each chamber to fill one chamber and move said piston to dispense a measured volume of liquid from said other chamber; and said piston including a hollow volume, said volume being accessible for removal and insertion of weight to permit adjustment of the specific gravity of said piston to approximately match the specific gravity of said liquid.

2. A device according to claim 1 and further including a clearance between said piston and cylinder for being filled by said liquid, said piston being in suspended equilibrium in said liquid thereby reducing leakage of said liquid through said clearance during dispensing.

3. A device according to claim 2 wherein said cylinder is positioned vertically and said piston is movable vertically within said cylinder.

4. A device according to claim 3 wherein said piston has a central axis and further including means for substantially centering said weight on said central axis.

5. A device according to claim 3 wherein said piston includes a removable plug for removal and insertion of said weight.

6. A device according to claim 1 wherein said piston includes two separable sections in a central spindle for maintaining the sections in assembled position and further including weights for mounting on said spindle.

7. A method for dispensing a measured volume of liquid from a source of fluid under pressure in a device having a cylinder with free position for reciprocal traveling in said cylinder, the cylinder having a chamber on each side of the piston, the method comprising:

adjusting the specific gravity of said piston to approximately match the specific gravity of said liquid being dispensed by providing a piston having a hollow volume, said adjusting step comprising inserting or removing weight from said hollow volume to approximately match said specific gravities, and supplying said liquid under pressure from said source alternatively to each chamber to fill one chamber and move said piston to dispense said measure volume of liquid from said other chamber, said approximate match of said specific gravity of said piston and liquid providing for accurate dispensing of liquid.

8. A method according to claim 7 wherein the ratio of the specific gravity of the piston to the specific gravity of the liquid being dispensed is between about 0.8 and about 1.2.

9. A method according to claim 8 wherein the ratio of the specific gravity of the piston to the specific gravity of the liquid being dispensed is between about 0.95 and about 1.05.

10. A method according to claim 9 wherein the ratio of the specific gravity of the piston to the specific gravity of the liquid being dispensed is between about 0.98 and about 1.02.

* * * * *